United States Patent [19]
Sumner

[11] Patent Number: 6,092,557
[45] Date of Patent: Jul. 25, 2000

[54] OFFSHORE PIPELINE WITH WATERPROOF THERMAL INSULATION

[76] Inventor: Glen R. Sumner, 8306 Leafy La., Houston, Tex. 77055

[21] Appl. No.: 09/191,084

[22] Filed: Nov. 12, 1998

Related U.S. Application Data

[63] Continuation of application No. 08/520,711, Aug. 29, 1995, Pat. No. 5,871,034, which is a continuation of application No. 08/394,184, Feb. 24, 1995, abandoned, which is a continuation-in-part of application No. 08/297,059, Aug. 29, 1994, abandoned.

[51] Int. Cl.[7] .................................................. F16L 9/14
[52] U.S. Cl. ............................................. 138/149; 138/140
[58] Field of Search .................................. 138/149, 141, 138/111, 116, 140

[56] References Cited

U.S. PATENT DOCUMENTS

| | | | |
|---|---|---|---|
| 1,179,374 | 4/1916 | Many | 138/149 |
| 3,706,872 | 12/1972 | Trabilcy | 219/300 |
| 4,106,528 | 8/1978 | Laing | 138/149 |
| 4,289,172 | 9/1981 | Ekstrom | 138/149 |
| 4,374,687 | 2/1983 | Yamamoto | 156/71 |
| 4,399,319 | 8/1983 | Zinn | 174/47 |
| 4,449,852 | 5/1984 | Muszynski | 405/168 |
| 4,963,420 | 10/1990 | Jarrin et al. | 138/111 |
| 5,120,381 | 6/1992 | Nee | 156/187 |
| 5,192,039 | 3/1993 | Williams | 248/62 |
| 5,271,974 | 12/1993 | Upchurch | 138/141 |
| 5,462,091 | 10/1995 | Saupe | 138/141 |

Primary Examiner—Andres Kashnikow
Assistant Examiner—Davis Hwu
Attorney, Agent, or Firm—R. William Beard, Jr.; Frohwitter

[57] ABSTRACT

A pipeline comprising pipe with a bituminous composition laminated onto a surface thereof and mechanical means for preventing the pipe from moving under its weight relative to the composition, the composition being applied to a thickness that will substantially inhibit heat transfer between the contents of the pipeline and the environment, wherein the means for keeping the pipe from moving through the insulating composition is a sleeve positioned along the pipeline, and adjacent to the insulating composition, the sleeve being held in a fixed position relative to, and spaced away from the pipeline by mechanical means that contact the pipe and the sleeve.

6 Claims, 8 Drawing Sheets

Section A-A  Plan View

OFFSHORE PIPELINE WITH WATERPROOF THERMAL INSULATION

This application is a continuation of Ser. No. 08/520,711 filed Aug. 29, 1995 now U.S. Pat. No. 5,871,034, which is a continuation of Ser. No. 08/394,184 filed Feb. 24, 1995 now abandoned, which is a CIP of Ser. No. 08/297,059 filed Aug. 29, 1994 now abandoned.

BACKGROUND OF THE INVENTION

1. Field of the Invention

This invention relates to insulated pipelines, pipeline insulating materials which utilize a bituminous component and particularly to a more cost-effective, insulated offshore pipeline.

2. Related Art

At low temperatures, the flow through pipelines can be impeded by high viscosity and wax formation in liquid products such as oil, and by hydrate formation in products such as natural gas. These problems can be reduced by using thermally insulated pipelines, but insulated pipelines are expensive on land and even more costly offshore. For offshore pipelines it has usually been more cost-effective to reduce the need for insulation by injecting various chemicals into the product. Recently, however, more and more oil and gas is being produced in deeper, colder water, from sub-sea production systems where use of viscosity reducing chemicals requires a dedicated line to transport them to the wellhead. This, combined with the fact that the cost of insulating pipelines typically increases with depth, means that insulated pipelines are most expensive where the alternatives are least attractive.

Various materials have been used to insulate land pipelines, including expanded cork, polymer foams, calcium silicate and others. Insulating pipelines offshore is somewhat more complicated because most insulating materials can become saturated in water when submerged. Some insulating materials incorporate watertight closed-cell structures, but all have some depth limit at which the cellular structure will collapse, and most will fail in a few hundred feet of water. Furthermore, most common insulating materials have little resistance to impact, abrasion or crushing, and must therefore be encased. If the water depth exceeds the hydrostatic pressure limitations of the material then the casing must also isolate the insulating material from the hydrostatic head of the water.

If the pipeline is laid in sections it is a practical necessity to prefabricate each individual pipe section as an independent pressure vessel. Because pressure resistant double pipes are too stiff to spool, several reel laid pipelines have been installed with flexible coatings of solid, elastomers or elastomers filled and extended with other lightweight materials. Examples include neoprene and EPDM rubber, EPDM and polyurethane elastomers filled with glass micro-spheres, and ebonite filled with cork. Unless the insulation requirement is minimal, the total cost of pipelines insulated in this manner is even higher than one which uses a pressure resistant casing to protect less expensive insulating materials.

Partly because of this expense, pipeline contractors are increasingly using "the controlled depth tow method" for laying bundles of several small pipelines that carry oil from underwater wellheads to nearby platforms. In this method, several small pipelines are fabricated onshore, inside a larger casing pipe as illustrated in FIG. 8. The casing pipe, 33, is sized to act as a floatation for the pipelines, 32. Techniques for changing ballast are used to keep the overall density of the bundle very near to the density of water so that it can be suspended between tugs at either end while it is towed to its offshore site. Once it is arrives at the destination, ballast is added to cause it to sink to the sea bed. The ballast must be heavy enough to cause the bundle to be stable on the sea bed in the presence of prevailing water currents. Pipelines have been similarly towed along the bottom, but here too, weight is closely controlled to reduce drag. If insulation is necessary or desirable, then it is desirable that the ballast have low thermal conductivity. In the past, gelled petroleum products have been used. A slurry of bentonite, water and fly ash cenospheres has also been used.

The thermal resistance offered by paint and corrosion coatings is slight due to the fact that the corrosion coatings are generally thin. Bituminous coatings were once commonly used for corrosion coatings for offshore pipelines. "Coat and wrap" coatings comprise two or three layers of Kraft paper, felt or fiberglass fabric, that are wrapped onto the pipe as they are being impregnated with hot asphalt or coal tar bitumen that is extended with finely divided mineral fillers such as fly ash, talc, finely divided silica or calcium carbonate. These coatings are 0.90 to 0.250 inches thick. "Pipeline mastic" coatings are thicker layers of asphalt concrete extruded onto the pipe. Pipeline mastic comprises calcium carbonate, sand, gravel, fiber glass and asphalt, and is ½ to ¾ inch thick. In both types of coatings the fillers reduce cost and build viscosity, but the effective thermal conductivity of these fillers is five to ten times that of pure bitumen, and they therefore substantially increase the conductivity of the composition. The thermal conductivity of mastic coatings, for example is 3.5 to 4 times that of pure bitumen. The thermal conductivity of "coat and wrap" coatings is somewhat lower depending on the fabric wrap, but they are so thin that they provide less insulating value than the naturally occurring phenomenon of "self burial" of the pipeline due to scour and currents. Because the fabric layers are separated by very thin layers of bitumen, porous fabrics such as felt will eventually absorb water.

Terminology that is used to describe the most common types of bitumen is used inconsistently. "Asphalt" originally applied to natural deposits of petroleum bitumen and sand. Most asphalt used today is made from refined petroleum bitumen, which is essentially pure hydrocarbon, It was originally called "straight run asphalt", but this is sometimes shortened to "asphalt". In almost all commercial applications mineral fillers are reintroduced to reduce cost and tackiness and to increase dimensional stability at warm temperature. Thus, the word asphalt can refer to pure petroleum bitumen, or to bitumen and other earthy matter. Because pure bitumen is normally only used as a component in other asphalt products, its thermal conductivity is not tabulated in most general engineering handbooks. Values for these products vary widely, but are commonly listed simply as asphalt. Many oil exploration and production industry handbooks, for example, publish thermal conductivity of asphalt as it is found in oil wells, comprising hydrocarbons and other minerals. Pipeline industry reports give thermal conductivity for asphalt and coal tar pipe coatings. In fact, the thermal conductivity of pure bitumen is among the lowest of all solid materials. Various polymeric modifiers are also known to extend the range of temperatures over which bitumen remains dimensionally stabile. Some do so by chemically reacting with, or in the presence of the bitumen while others behave as a second continuous phase that forms a network, or has an affinity with the bituminous component. U.S. Pat. No. 5,306,750, for example, disclosed that epoxide containing polymers can be caused to react to improve resistance to deformation. Some of those that have been shown to improve dimensional stability by forming a continuous phase network with the bitumen include styrene butadiene (SBR) rubber styrene-butadiene-styrene (SBS) rubber, styrene-ethylene/butylene-styrene (SEBS) rubber, ethylene vinyl acetate, other block co-polymers, polyolefins, neoprene latex, and other elastomeric materials. Some of these can lower the of embrittlement temperature and raise the melting temperature. The effect of fillers is to raise viscosity at all temperatures, even above the melting point of the bitumen. Highly filled bitumen behaves as a mastic, even when the bitumen itself is a molten liquid. The combination of fillers and polymeric modifiers can increase softening point beyond what fillers alone or polymeric modifiers alone can achieve.

Some polymeric modifiers are finely divided particles such as crumb rubber or polyolefins. These materials may behave more like fillers than as a second continuous phase and unlike mineral fillers, their elasomeric properties also increase the flexibility of asphalt at low temperature. Some of these polymers melt, but behave as an emulsion rather than a continuous phase when mixed with molten bitumen. Mineral fillers are usually used to reduce cost and increase dimensional stability of bitumen whether or not it contains chemical or polymeric modifiers that react or form a network with the bitumen.

Sulfur and carbon black are also known to increase the softening point of bitumen,

SUMMARY OF THE INVENTION

This invention is directed to a waterproof insulating composition, cost-effective insulated pipelines, and insulating laminate compositions comprising a suitable substrate to which said composition is applied. Such compositions exhibit many of the same properties as rubber or plastic insulating materials known in the prior art for insulating offshore pipelines, yet they are much less expensive. The insulating material comprises two essential characteristics: (1) it is substantially based on a bituminous material such as coal tar or asphalt, and (2) additives, fillers or modifiers to the bitumen do not greatly raise the thermal conductivity compared to pure bitumen.

An example of such an embodiment is a pipeline with a bituminous composition laminated onto a surface thereof, wherein any additives other than bitumen are included in a quantity and have thermal conductivity such that the thermal conductivity of the composition is no more than 0.12 BTU/(hr*ft*°F.).

Means for enhancing dimensional stability of the bituminous composition or of preventing movent of the pipeline through it may also be provided. This can be a mechanical restraint, or a modifier to the bitumen itself. For the purpose of this disclosure, a modifier is considered to be any additive to the bitumen that is not itself a bitumen, including materials that react with the bitumen, materials that form a continuous phase network with the bitumen, or fillers that are mostly inert but more dimensionally stable than the bitumen itself over the operating temperature range of the pipeline. It should be noted that bitumen has been characterized as a colloidal system at ambient temperature, wherein asphaltines are the dispersed phase. The term "filler" or "extender" as used here includes particulate matter other than the natural hydrocarbon components. Fillers may be polymeric, elasomeric or cellular materials, particles or fibers. The filler may be an open-cell or slightly porous material, such as volcanic aggregates, vermiculite or diatomaceous earth, that has porosity that is fine enough that the molten bituminous binder does not completely fill the voids when filler is mixed into it, it can be a closed-cell material, such as perlite, fly ash cenospheres, glass microspheres, it can be cellular plant materials like wood chips or bagasse, or it can be tubular materials such as reeds, rush, bamboo or pieces of plastic tubing.

DETAILED DESCRIPTION OF THE PREFERRED EMBODIMENTS

Figure 2:
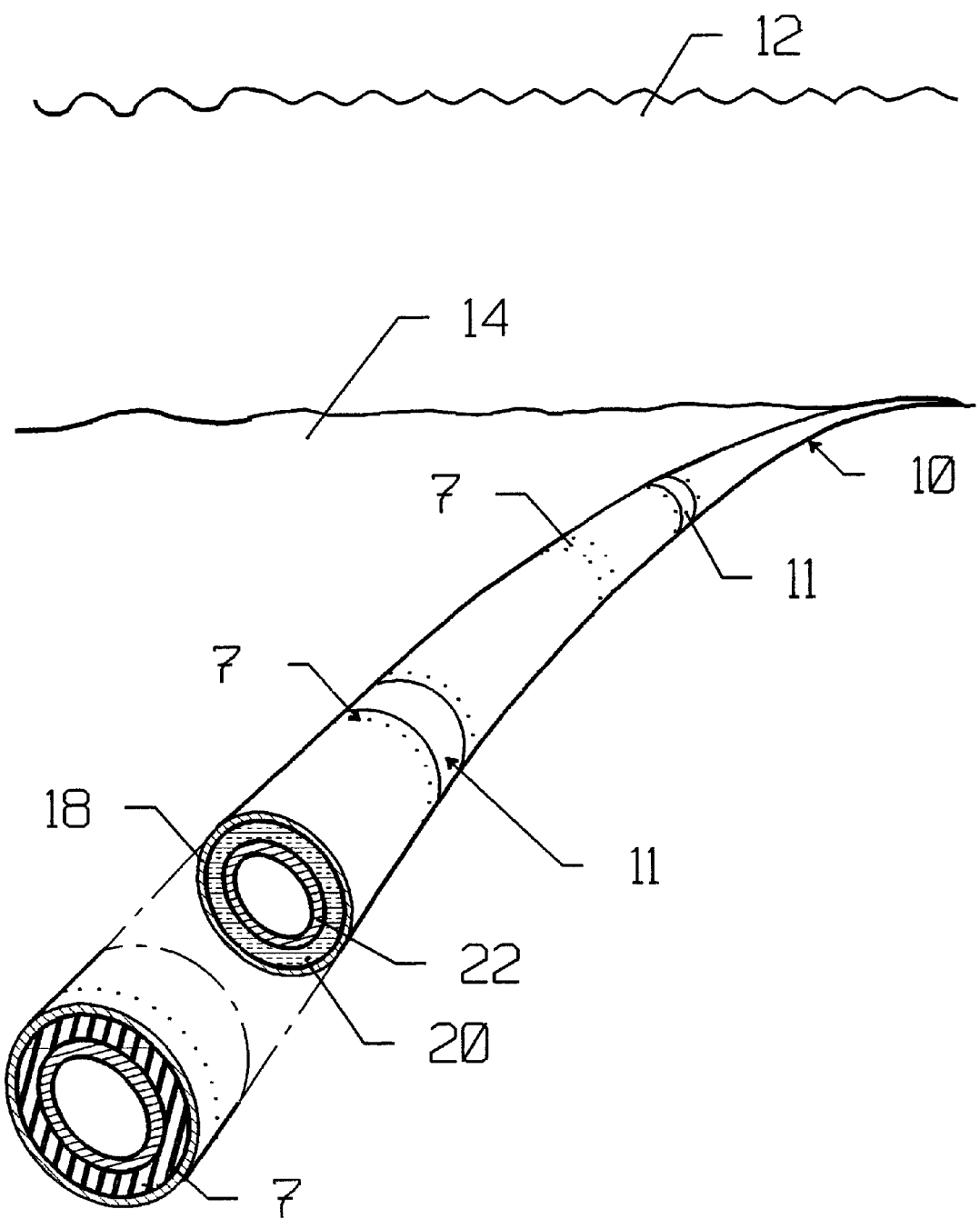
FIG. 2, shows a cross section of a pipeline wherein an insulating coating is laminated between the pipe and a sleeve that is larger than the pipeline, said sleeve being mechanically connected to the pipeline to prevent the pipe from moving relative to the sleeve.
Figure 3:
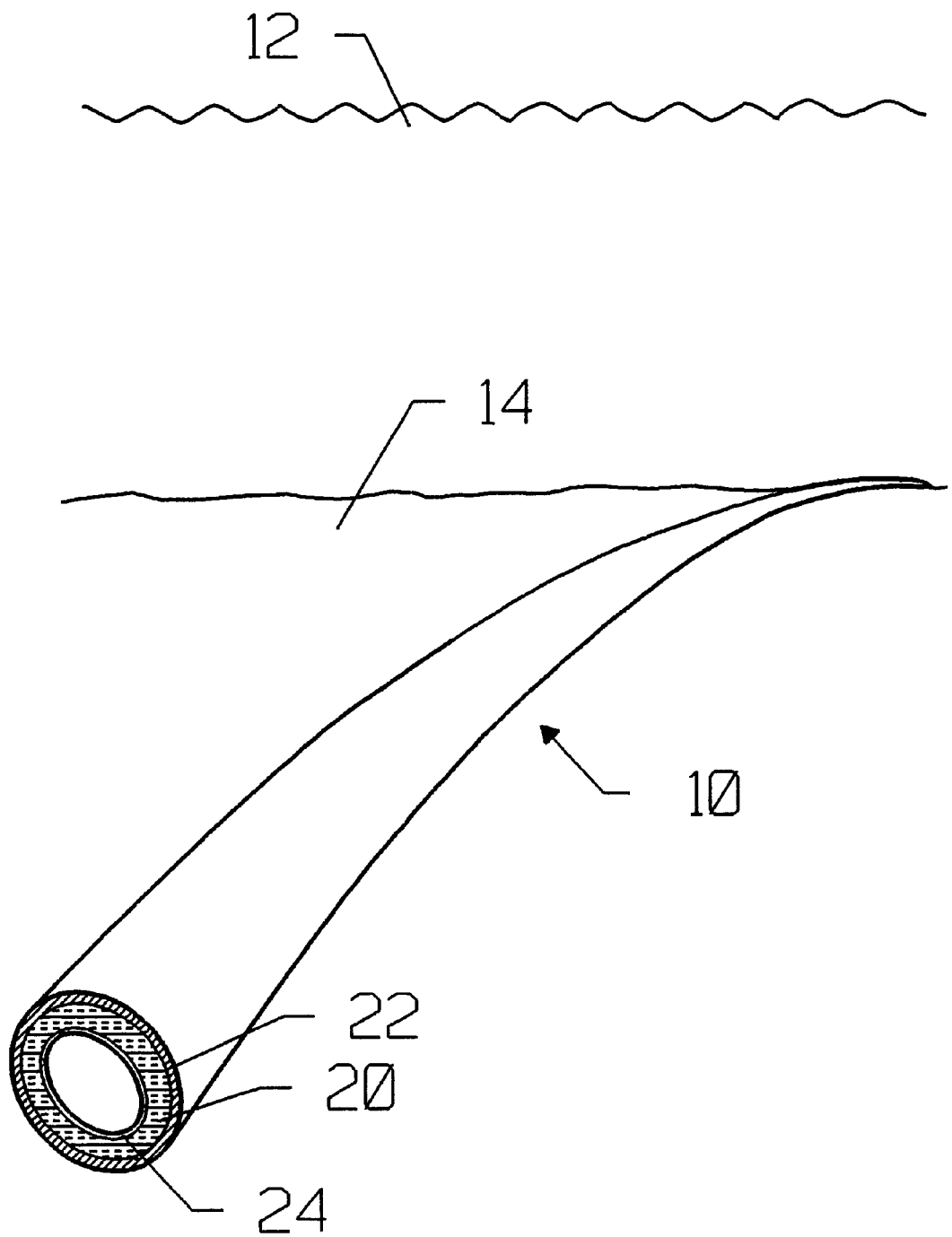
FIG. 3, shows a cross section of a pipeline where the insulating layer is laminated between the line pipe and a sleeve that is smaller than the inside diameter of the line pipe.
Figure 4:
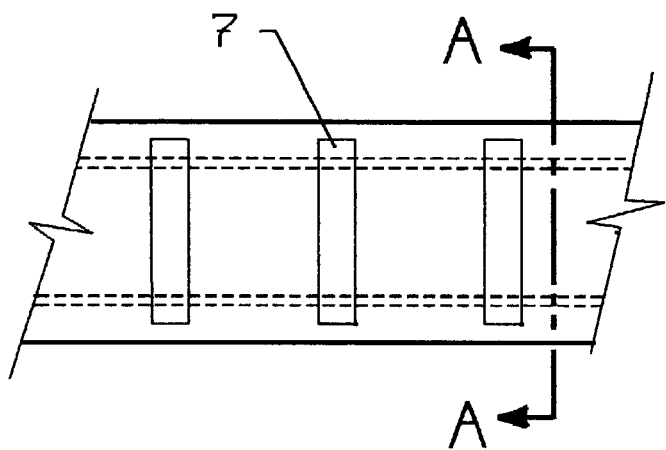
FIG. 4 shows a cross section of a pipeline wherein supports are embedded inside an insulating composition to connect the cooler layers of the insulating composition to the pipe to prevent the pipe from moving through the insulating composition.
Figure 4:
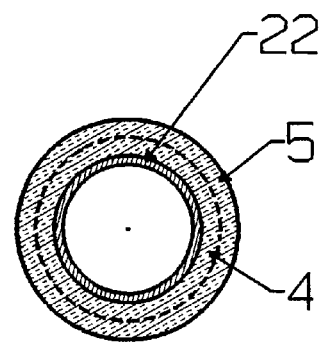
Figure 5:
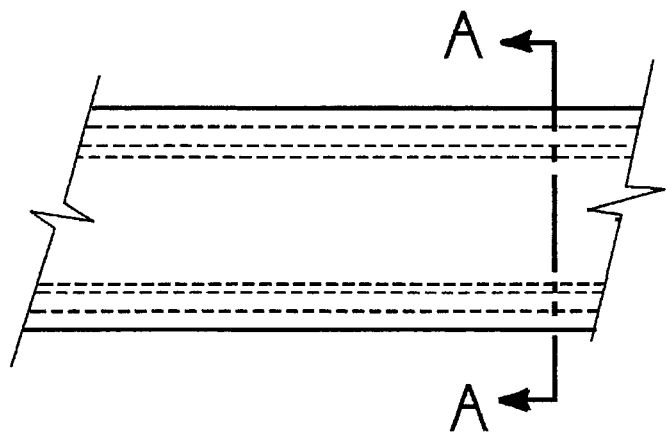
FIG. 5 shows a cross section of a pipeline wherein an insulating composition adjacent to the pipe acts as to connect the cooler outer layers of a different insulating composition.
Figure 5:
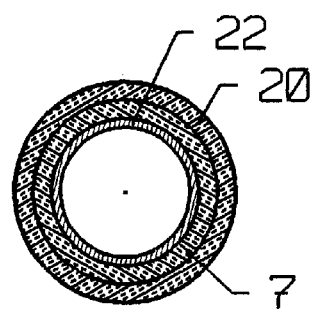
Figure 6:
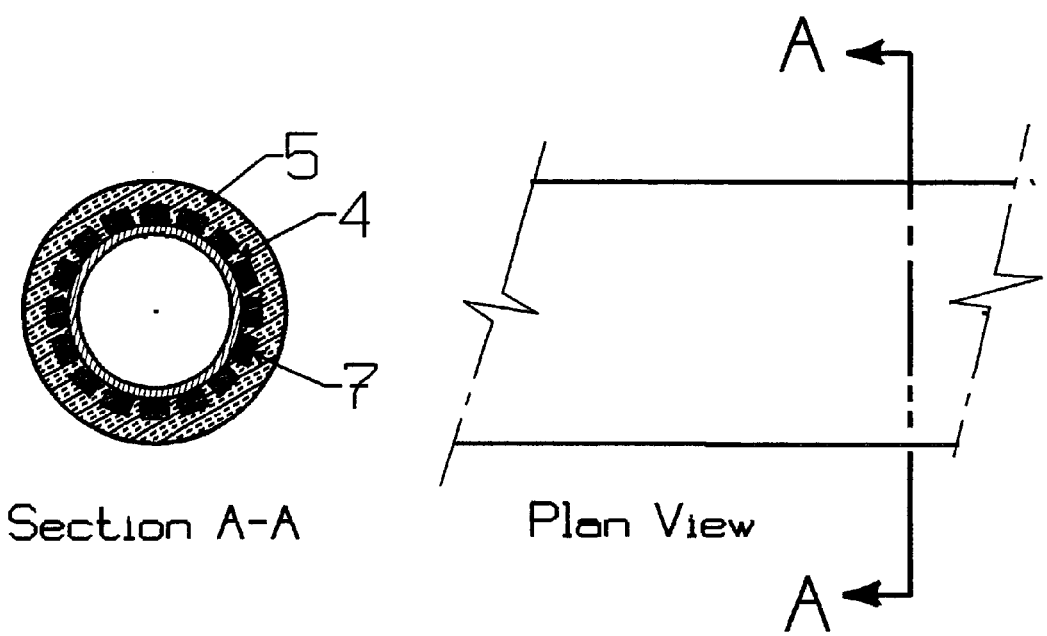
FIG. 6 shows a cross section of a pipeline wherein the bituminous coating is filled with tubular materials that are laid parallel to the axis of the pipe.

The present invention is directed to a cost-effective offshore pipeline insulated with a composition comprising a bituminous binder material. Such composition maintains low thermal conductivity when submerged, and can be somewhat flexible, thus being useful for insulating underwater pipelines. The main drawback of bituminous materials for insulating pipelines is the wide variation in mechanical properties with temperature that occurs in ambient temperature ranges. Most offshore pipelines that have been insulated to date have been insulated to keep the product warm. Typical temperatures for produced crude or gas will be in the range from 120 degrees F. to 200 degrees F., although wellhead temperatures can exceed 300 degrees F. At these temperatures some bituminous substances will be molten, and most will be subject to substantial creep, or if not they will probably be brittle at ambient temperature. If a warm, submerged pipeline were coated with a thick coating of a bituminous substance, the center would be much softer than the outside. Over time, the pipeline would sink under its own weight into the soft portion, eventually exposing the bottom of the pipeline. Preventing this is a subject of this invention. This can be reduced by refinements to the composition, as will be described later, or by more direct mechanical means. The most direct mechanical means, is to laminate the coating between the line pipe and a sleeve that is mechanically connected to the line pipe. FIG. 2 and FIG. 3 illustrate a sleeve connected with rings spaced along the length of the pipe. The mechanical connection can be any mechanical spacer that can support the required loads, including be a raised spiral, longitudinal strips. Because the insulating composition is waterproof under high hydrostatic pressure, the sleeve need not be sealed, and need not be independently collapse resistant as it would with insulating materials that do not have high compressive strength. For this reason, the sleeve can be made of thin, inexpensive material. Furthermore it need not be continuous across the field joint in the pipeline, thus eliminating one of the most difficult problems with encased insulation designs. The most interesting and efficient sleeve is deceptively simple. It is the cool outer stratum of the insulating composition itself. The mechanical connection is embedded in the coating and connects this layer to the pipe. This is illustrated in FIG. 4, where the mechanical connections are rings spaced along the length of the pipeline. Sea water temperature will usually be below 80 degrees F., and temperatures this high will only occur near the surface. It is possible to formulate pure bitumen that will not creep much at this temperature. If a more dimensionally stable material is embedded in the insulating composition at points along the length of a hot pipeline, it will react against the cool layers to keep the pipe from moving. The primary requirement for this means of mechanically connecting the cool layer to the pipe is that it must be a good enough insulator that it does not transmit too much heat to the cooler layers of the insulating composition. One of the benefits of this arrangement is the fact that the mechanical supports can be entirely encapsulated in the waterproof bituminous insulating composition, and therefore need not be waterproof. In FIG. 6, the mechanical connection 7 could, therefore, be wood strips or parquetry. The geometrically simplest connection is illustrated in FIG. 5, and is simply a layer 7 of a different insulating material that has adequate compressive strength and structural stability, such as aerated cement, bagasse and cement, or other traditional insulating materials. Unlike a pipeline where a bituminous coating serves only to waterproof an insulating layer, the coating of this invention is formulated and applied to contribute substantially to the thermal resistance of the composite. For pipelines that operate on land this distinction may appear to be academic, since conventional pipe insulating materials are far better insulators than bitumen, but these conventional materials do not have the compressive strength to resist deep sea pressure, even if they are kept dry.

In another embodiment the mechanical means for connecting said sleeve comprises at least one of a plurality of insulating layers at least 3 mm thick, the first layer being around and adjacent to said pipe. In a similar embodiment the means for connecting said sleeve to said pipeline comprises a plurality of insulating layers of different compositions that are applied in layers at least 3 mm thick, the first layer being applied around and adjacent to said pipe. Another embodiment of the invention is a pipeline coated with multiple layers of a fabric impregnated and covered with multiple layers of a bituminous composition wherein the total thickness of said multiple layers is at least 9 mm, or wherein any additives to the bitumen are included in a quantity and have thermal conductivity such that the thermal conductivity of the composition is no more than 0.12 BTU/(hr*ft*°F.)

In a similar embodiment the pipe is coated with multiple layers that are at least 3 mm thick.

Figure 9:
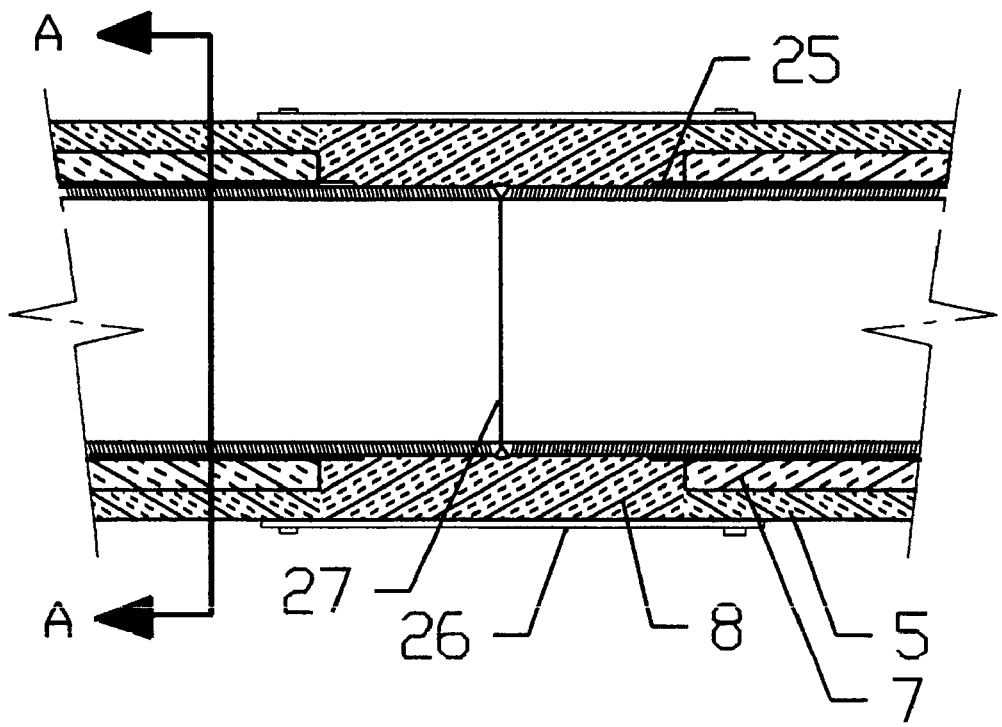
FIG. 9 is a field joint on a pipeline that is insulated with a layer of a porous material under a thick, bituminous coating.
Figure 9:
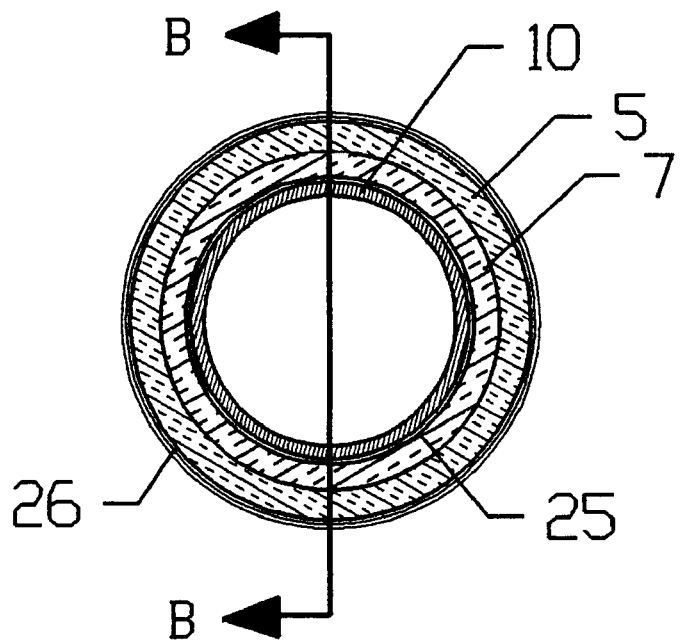

There is, however, another important feature of this arrangement that is not readily apparent. When pipe is laid offshore, time is at a high premium, so insulation is applied before the pipe is sent to the job site, except on a short stub that is left for joining the pipes. After the pipes are welded together, the field joint must be insulated. Several manufacturers insulate line pipe with polyurethane foam that is kept dry with a thin polyethylene jacket. This is normally used for land pipelines which are often buried, and even under the pressure of ground water, the field joints often leak. A persistent problem results from the fact that it is difficult to seal the end of the jacketed foam, since it is not easy to seal against polyethylene that is not solidly backed up. Most other polymers are more permeable or more expensive. Bitumen is very impermeable to water and costs less, so a much thicker layer costs the same, increases the thermal resistance, and is much easier to seal because it adheres easily to itself and many other materials. It is quick and easy to form a cavity into which hot bitumen can be poured by wrapping sheet metal around the joint as shown in FIG. 9. The bitumen fuses to the outside layer on the main insulation, leaving a continuous, insulating, waterproof jacket, and the bitumen in the field joint also acts as a barrier to the propagation of water from the insulation on one pipe joint to the insulation on another pipe joint. To appreciate this it is useful to list all the properties and features of bitumen that are important in this application, including 1) very low permeability, 2) low cost, 3) can be poured, 4) cures quickly, 5) adheres seamlessly to itself, 6) bonds to the pipe or corrosion coating, 7) has low thermal conductivity, 8) is tough enough not to be easily punctured, but flexible enough not to crack, 9) is non toxic, 10) is widely available. These properties have never all been exploited simultaneously in this way. This can be done with materials other than bitumen, but they are more expensive.

If the purpose of the insulation is to keep the contents of the pipeline colder than ambient, then no independent means for preventing the pipe from moving through the insulating coating is necessary, and fillers would serve only to reduce the cost or thermal conductivity of the bituminous material. It may also be true that some relative motion between the pipe and the insulating composition is tolerable or even desirable. This is because the soil itself acts as an insulator. The heat loss through the bottom of a pipe covered with an eccentric layer of insulation, that has almost no insulation on the bottom can be lower than might be expected based on experience with the insulating effects of complete burial. A fairly complicated thermal analysis can show that a disproportionately large share of the steady heat loss on a fully buried pipe is from the top. This is because the steady state heat flux lines emanate in a radial direction from the pipe into the soil, and then through an arc back to the surface. The difference in the heat path from the bottom and the top is much more than just the difference in the burial depth. Therefore, the insulating composition may be more efficiently used if there is some eccentricity, and this eccentricity can result when the pipe sinks. This concept can be extended to allow for deformation at certain points along the length of pipelines that rest on uneven bottoms where the load will be unevenly distributed. It also bears pointing out that because the density of bitumen is very near that of water, there is very little tendency for it to deform under its own weight if the pipeline is submerged. Because issues rased in the foregoing discussion are not immediately obvious, intuition may lead one to believe that a bituminous composition needs to be harder, or to support greater loads than is actually necessary.

The following sections discuss ways to improve the dimensional stability of bitumen by adding fillers or modifiers to bitumen These may increase the cost, and should therefore be formulated based on the real need, which in the context of the foregoing discussion may be less than expected. It may, for example, be more economical in some cases to use more bitumen with fewer, less expensive or no modifiers or fillers and simply count on some relative motion between it and the bitumen. For the purpose of this disclosure the term bitumen is meant to include all solid or semi-solid hydrocarbons in asphaltite, naturally occurring asphalt, asphalt derived from coal tar, or asphalt that is refined from petroleum, or "straight run asphalt". The term bituminous material is meant to include materials that are substantially based on bitumen from one or more sources or types. The term "bituminous composition" means bitumen or a composition of bitumen and modifiers. Particulate modifiers may constitute any fraction of the bituminous composition, so long as the binder in which these particles are dispersed is substantially based on bitumen. Since chemical modifiers for bitumen are generally much more expensive, and higher, or very little lower in thermal conductivity, economics will drive toward high concentrations of bitumen. The binder, for example, will normally be more than half bitumen by volume, and usually considerably more than half bitumen. The amount of filler will depend partly on the application method and the service depth.

Most commercial asphalt that is used in large quantities is extracted from petroleum. It is inexpensive but soft at moderate temperatures. Various techniques for reducing creep or softness have been used in other applications. Blowing air through asphalt causes oxidation that increases the softening point but also elevates the temperature at which the asphalt becomes brittle. Asphaltites are naturally occurring bitumen that has oxidized through natural weathering. Asphaltites contain varying amounts of impurities, but some types are mostly pure hydrocarbon with only very small amounts of impurities. They have high softening temperatures but can be less brittle at low temperature than oxidized petroleum asphalt. Asphaltites can be mixed with asphalt to maintain dimensional stability without brittleness over a wider temperature range but the more pronounced effect of oxidation or weathering is to raise both the softening temperature as well as the temperature at which the bitumen becomes brittle. Oxidation and weathering do not result in large changes in the thermal conductivity, and can therefore used to adjust the properties of the bitumen to suit the operating temperature of the pipeline.

In pipelines that are operating at temperatures greatly different from ambient, it may be desirable to use several layers of different formulations that have mechanical properties that are different at the same temperature, but similar at the temperature at which they will operate. In such an arrangement, a layer that is formulated so that it is not brittle at ambient temperature, but which would be soft at the pipeline operating temperature, could be applied over a formulation that would be brittle at ambient temperature. This case is illustrated in FIG. 5, wherein the mechanically stable layer 4 that is adjacent to the pipe is slightly different from the outer stratum, but where both strata are bituminous materials.

It has now been discovered that when fillers that entrap void, or gas filled spaces are added to a bituminous binder, the collapse resistance of the filler can be enhanced, and that the fillers themselves add body and reduce creep, while at the same time reducing the thermal conductivity. Open-cell fillers as well as closed-cell fillers can have this effect. Materials whose cellular structure is derived from plant matter such as wood, cellulose, jute, bagasse combine low cost and low thermal conductivity. Despite the fact that bitumen softens at higher temperature, fillers with fine porosity do not necessarily become saturated when mixed into the molten bitumen and are surprisingly resistant to becoming saturated with bituminous material or with water when the composition is subjected to hydrostatic pressure, Water does penetrate if the filler loading is high. This is a function of particle spacing the hydrostatic pressure and the thickness of the layer. The thermal conductivity of bitumen is quite low compared to most non-porous solid, or semi-solid materials, so that even if the bituminous material penetrates the filler in the hot stratum, there is still enough temperature gradient to limit this penetration to the hot stratum, and the benefit of reducing sag or creep is not affected. In short, porous fillers can reduce creep of bituminous substances, and the bituminous substances can effectively block water absorption in porous fillers for long periods of time under hydrostatic pressure. For pipelines that are insulated to keep the contents cool, or at only slightly elevated temperature, the effect of fillers combined with techniques for raising or lowering the softening point may eliminate any need for independent means of preventing creep or deformation.

Closed-cell water proof materials can be used in higher concentrations and deeper water. A filler made up of hollow spheres has the advantages that the ratio of volume of surface area to space is minimized, and that the spherical shape is very resistant to collapse. For pipelines in deep water, the filler will preferably be a closed-cell, pressure-resistant material, and for very deep water a spherical filler such as fly ash cenospheres can maximize collapse resistance. The thermal conductivity of the composition will depend on the ratio of filler to binder. The thermal conductivity of the filler will preferably be less than the thermal conductivity of the bituminous material so that it will lower the thermal conductivity of the composition. It follows that the thermal conductivity of the composition will be lower when the fraction of filler is higher, and the maximum amount of filler depends on the geometry of the filler. In deeper water, however, cellular fillers with conductivity lower than bitumen that will withstand this pressure without dimensional creep may be costly or non-existant. In those cases, cellular fillers with conductivity slightly higher than the bitumen can be selected based on the best combination of low cost and low thermal conductivity using the minimum amount of filler needed to achieve dimensional stability. Most fillers will have thermal conductivity less than 0.13 BTU/hr-ft-°F., but in this disclosure 0.24 BTU/hr-ft-°F. is considered to be a low conductivity filler. This is less than half as low as most fillers used in pipe coatings of the past. It may also be useful to include small amounts of higher conductivity fillers because of an irregular shape that imparts good mechanical properties to the bitumen, most (for example more than 50%, and probably more than 75%) of the fillers will usually be low thermal conductivity materials. The important value is the thermal conductivity of the entire composition. In most applications it will be possible to keep this below 0.12 BTU/hr-ft-°F. In some cases the true thermal conductivity of the filler itself may not be known. For some materials, particularly fibrous materials or microspheres, reported thermal conductivity is based on measurements of a loose fill. This is actually the thermal conductivity of a composition of air and particles, not the particles themselves. Other materials, such as mica, are anisotropic. That is, the thermal conductivity depends on the orientation of the sample relative to a grain or crystal structure. For the purpose of this disclosure, the term effective thermal conductivity will be used to characterize the true thermal conductivity of particles or fibers based on their effect in a composition. This value may, in fact, only be indirectly determinable using verified mathematical models for inferring the thermal conductivity of a dispersed phase based on the measured conductivity a continuous phase and a composition of the continuous phase and the dispersed phase. If the particle in question is a fine form of an isotropic, homogeneous material on which the thermal conductivity can be measured, the effective thermal conductivity is the measured value. The filler to binder ratio can be optimized by various methods. As an example, two sizes of spherical fillers such as glass microspheres can be made to occupy a larger fraction of the total volume than one. Generally, production of microspheres results in a dispersion of sizes but packing density can be improved by using sieves to grade them into several size ranges. The practical maximum amount of filler will be determined by experiment. Typically, without size grading, microspheres can occupy 40 to 60 percent of the total volume. Using a combination of very fine fillers and a larger aggregate can further increase the amount of space occupied by the fillers. A mixture that is made by stirring the binder into molten asphalt could have a filler to binder ratio of up to 0.75. There are also other practical considerations. When a very high filler-to-binder ratio is used, the composition becomes a stiff mastic that may be difficult to apply. Perhaps more important, compositions with high filler loadings are characterized by voids at the interface between the binder and the filler. This allows water to migrate into the composition, thus increasing its thermal conductivity.

Figure 7:
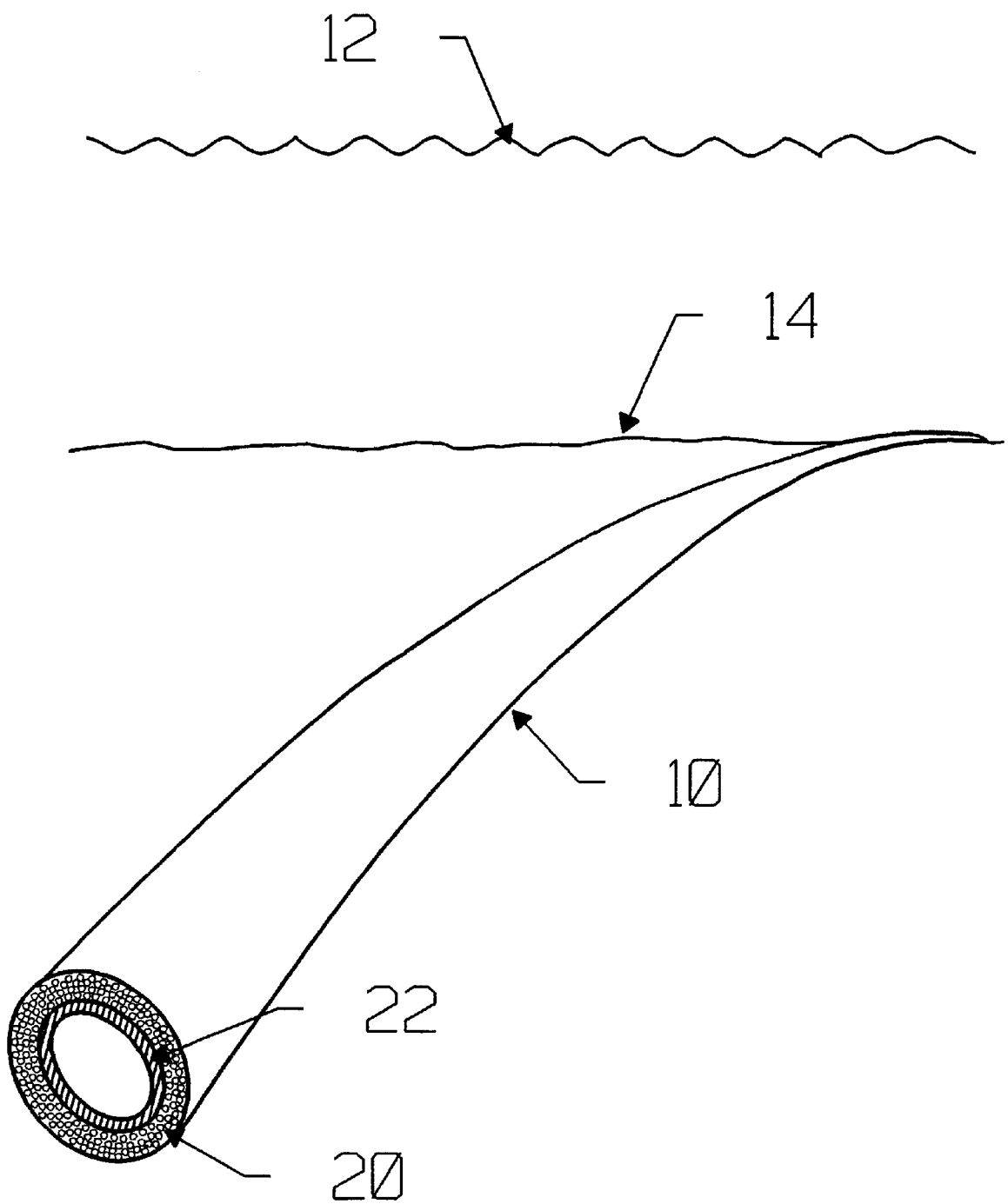
FIG. 7 shows a cross section of a pipeline wherein an array of rectangular supports are embedded inside an insulating composition to prevent the pipe from moving through the hot stratum.

Cylindrical fillers, such as grasses, or plastic tubing can also be used alone or in conjunction with porous or closed cell fillers previously described, where the term grasses includes reeds, rush, and bamboo. The term filler is construed broadly to include larger tubes such as bamboo or plastic tubing that are laid parallel to the axis of the pipe. The material in the interstices may, itself, be a combination of a bituminous material and a finer filler. The tubes may be laid onto the pipe before or while the other components of the insulating composition are being applied. The resulting cross section is shown in FIG. 7. If the tubular pieces are laid so that they are in contact, they can also be construed as, and serve as the a mechanical link between a hot stratum in the interstices, and a cooler stratum. In this example the functions of the filler and the mechanical connection are identical, and the conceptual similarity that exists throughout this disclosure, becomes more apparent.

Polymeric modifiers that extend the temperature range over which bitumen remains dimensionally stable generally have low thermal conductivity and can therefore be useful in this invention. This applies to polymeric fillers, chemicals that react with the bitumen, and polymers that behave as a second continuous phase acts as network with the bitumen.

Some of the materials tested for use in this invention were found most effective for lowering the point of embrittlement, while others raise the softening point. In the prior art, most polymer modified bitumen has been used outdoors, typically requiring some ductility at temperatures well below freezing. Offshore pipelines, however, are rarely laid or used in environments much below the freezing point of water. Non-oxidized, asphalts that are compatible with most of these polymeric modifiers are flexible enough for this use at near freezing. Hence, it was found to be more convenient to raise the softening point of non-oxidized bitumen than to lower the embrittlement point of oxidized bitumen.

A combination of atactic and isotactic polypropylene was found to be cost-effective and useful. The atactic polypropylene can raise the softening point without raising the point of embrittlement. Softening point increases very rapidly as the concentration of atactic polypropylene is increased through a transition range that is dependent on the asphalt, but generally in the range 18 to 30% of the weight of the composition. Above this level the softening point of the composition is dominated by the softening point of the atactic polypropylene, and below the transition range the softening point is near the softening point of the asphalt. Above this range, further increased in softening point, and hardening of the composition can be more effectively achieved by blending low molecular weight, isotactic polypropylene. In absence of atactic polypropylene, isotactic polypropylene tends to act mainly as a particulate filler, but when used in this way it seems to have an affinity to the atactic polypropylene. Air entrapping fillers can be used with this to harden it and further increase the softening point. The following formulation was found to be cost-effective and useful.

| Component | % by weight of binder range | typ. | % by volume composition |
|---|---|---|---|
| BINDER | | | 70 to 100 |
| AC-20 grade petroleum bitumen | 85 to 5 | 77 | |
| Isotactic polypropylene | 0 to 15 | 5 | |
| Atactic polypropylene | 15 to 45 | 18 | |
| FILLER | | | 0 to 60 |

Even at low filler loading the softening point of this composition can exceed 300° F., yet it retains adequate flexibility for the pipeline to be laid, or bent onto a reel without cracking at temperatures near freezing.

This composition is relatively soft in hot weather, and may therefore deform under high loads due to reeling. More isotactic polypropylene or filler makes it harder, and further increase softening point, but may make it too brittle to reel at temperatures below freezing. This can be offset by adding styrene block copolymers such as SBS. Block copolymers cost 25 to 50 times as much as petroleum bitumen so they are used sparingly, They are typically in concentrations from 3 to 12% of the weight of asphalt in applications where they are used alone. In this application benefits can be obtained with 3% to 5%, although more may further improve cold properties.

The polymer concentrations suggested in the foregoing are based partially on compromises between cost and benefit, and do not cover the entire range of possibilities, For pipelines that operate at high temperatures it may be more cost-effective to use several layers comprising different polymer loading in each layer. The foregoing compositions have not been used for this purpose in the past.

To avoid the need for heating the material, some bituminous compositions can be thinned with solvents, or emulsified in water. The resulting substance can then be cured by allowing the solvents or water to evaporate. This is only useful on fairly thin layers.

A related composition can be made by adding an emulsion of bituminous material and water to a mixture of cellular fillers and hydraulic cement. The low cost and availability of Portland cement make it attractive, but other types of cement can be used. The cement cures to form a structural material that retains its strength over a wide temperature range, while the bituminous component reduces water absorption and lowers the thermal conductivity compared to binders made entirely of hydraulic cement. In such compositions, using too much bituminous component can inhibit the reaction. Useful limits vary with the amount, and type of cellular filler, but the bituminous component will be a relatively small part of the total. Bituminous components of five to ten percent of the weight of cement will significantly reduce water absorption compared to a composition of cement and cellular filler. Larger amounts of bituminous material will further reduce water absorption, and thermal conductivity of the composite binder, but will also weaken it. Considerably more cement than bituminous material is needed for it to provide effective structure. This composition eliminates the need for a separate means for preventing creep. In the context of this patent, another way of thinking about this is that it is a composite material wherein the bituminous material is dispersed in the means for preventing the pipe from moving relative to it. The insulating composition may be applied to pipes (or other substrata) by casting, spraying, depositing a softened mass between two counter-rotating brushes that accelerate the mass to impinge onto the pipe at high velocity, thereby compacting the material causing it to stick together in a thick layer, by extruding or by casting elongated ring segments and bonding or fastening these segments to the pipe.

The thickness of the coating will depend on the temperature of the sea water, the pipe dimensions, other coatings that may be present, the temperature, pressure and properties of the material to be transported and the conductivity of the specific cured composition.

The bituminous composition need not be applied concentric to the pipe, it need not cover the entire surface of the pipe and can be used to insulate a plurality of pipelines assembled in a bundle.

One or more of the pipelines in a bundle may serve to carry hot fluid to make up for heat lost through the insulation. Electric heating elements may also be attached to the pipe or pipes. "Heat tracing" as this is known, is only practical if the heater pipes or elements are thermally connected to the pipeline and thermally insulated from the surroundings. This thermal connection can be made or enhanced by applying a highly conductive material so that it touches the heater pipe or element and the pipeline or pipelines. It could be weld or solder metal or a hydraulic cement or polymer adhesive filled with metal filings or other conductive particles. In this case, the bituminous composition will surround the pipelines, the heating pipes or elements and the conductive cement, and it is possible that the insulating composition may surround the entire bundle without touching all of the pipes in the bundle.

In this patent the phrase "a pipeline comprising pipe and a bituminous composition laminated onto the surface thereof" can also mean "a plurality of pipelines comprising pipes in a bundle with a bituminous composition laminated on and around the outside surface of said bundle of pipes". It can also mean "a plurality of pipelines comprising pipes and heating elements in a bundle with a bituminous composition laminated on and around the outside surface of said bundle of pipes and heating elements".

For example, in this invention the small pipelines that are installed in a cased bundle that is assembled onshore and towed to its destination are insulated with bitumen in the space between them and the casing pipe. It has been discovered that pulverized asphaltite can be mixed into a slurry of water or oil, and then pumped into the casing, and around the pipelines. It is ideal for this purpose because it has a density very near that of water. Most other materials of comparably low conductivity are lighter, and hence would float to the surface and would not add as much ballast. An oil slurry is preferred because the asphaltite will dissolve in the oil to form a tar. Since this process occurs slowly at ambient temperature, it remains pumpable during the installation process, but when the pipelines get hot, the asphaltite quickly dissolves or absorbs the oil. A similar result can be achieved with oxidized petroleum bitumen or bituminous coal instead of asphaltite. The main advantage of asphaltite is that certain types such as Gilsonite are very pure, and therefore exhibit low thermal conductivity very near to that of pure bitumen without refining or special processing.

An alternative is to use a mixture of hydraulic cement and asphalt emulsified in surfactants and water. The emulsion remains liquid long enough to pump it into the pipe and then turns to a gel or pudding-like consistency. Preferably the amount of water in the emulsion is kept to a minimum, since the conductivity of water is higher than that of the bitumen. Similarly, the amount of cement used should be the minimum amount needed to cause the material to gel sufficiently to prevent convection, since the conductivity of most hydraulic cements are higher than the conductivity of water. Other materials that react slowly with water and set to a solid or semisolid can also be used. Experiments related to this invention have shown that an emulsion of six parts asphalt to 3 parts water and surfactants will remain liquid for some time after it is mixed at the job site with one to two parts Portland cement, but that after 24 hours it takes on the consistency of thick pudding. The thermal conductivity of this cured composition is low enough to be useful in some cases, but not as low as the slurry of Asphaltite and oil.

References to pipelines in this disclosure are meant to include small pipelines known as flow lines, such as those that connect wellheads to gathering manifolds or platforms, and pipelines made of any type of pipe, including plastic pipe, pipe made of composite materials, and pipe made of several layers, including flexible pipe and hose. References to the pipe from which the pipeline is made are intended to include any of these types of pipe. A pipeline is meant to include risers that extend from the sea bed to the surface on offshore pipelines. In the pipe is comprised of several layers, such as is the case with flexible pipe known in the prior art, then the bituminous composition can be outside these normal layers, or it can be an intermediate layer that is made with the pipe.

Figure 1:
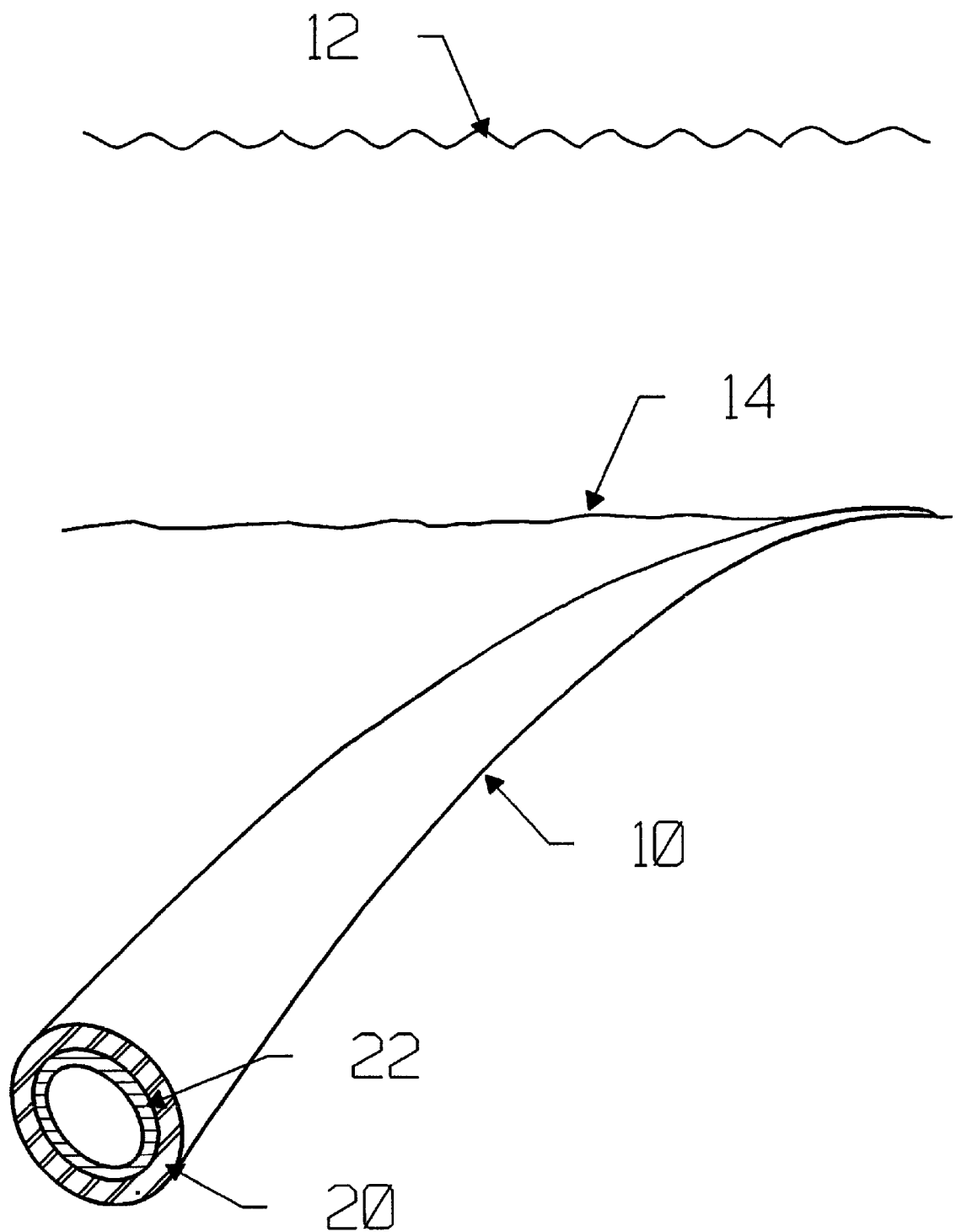
FIG. 1 is an insulated pipeline lying on a marine floor, the end of which is shown as a cross section consisting of a pipe, and an insulating coating.

Referring to FIG. 1, a pipeline 10 is shown on the marine floor 14 where 12 is the water level. The pipeline is coated with the insulating composition 20, around the line pipe 22, the pipe being a suitable substrate for the insulating coating. In FIG. 2 a sleeve 24 extends over the line pipe and the insulating material is adhered to both the line pipe 22 and the sleeve 24. The sleeve is connected to the pipe with supports, 7 and is not continuous across the field joints. In FIG. 3, the insulating composition, 20 is laminated between the pressure containing line pipe, 22 and a sleeve, 24 of smaller diameter. In FIG. 4, the pipe 22 is covered by a layer an insulating composition that comprises two stratum, 4 and 5 that may be of slightly different bituminous compositions, or they may be distinguished only by the change in mechanical properties that results from the difference in temperature. The stratum 5 that is furthest from the line pipe 10 is held in a fixed position relative to the pipe 10 by a mechanical connection 7 that is embedded in the stratum 4 that is nearest the line pipe 22. FIG. 5 is similar to FIG. 4, except that the mechanical connection 7 occupies most or all of the space adjacent to the line pipe 22, thus mostly substituting for the insulating composition, 20 in that space. In FIG. 6, rectangular strips 7 are placed around and adjacent to a pipe 22 and are surrounded by a stratum 4 of an insulating composition. Said rectangular strips connect the pipe 22 to an outer stratum 5 of the insulating composition to keep it in a fixed position relative to said pipe. FIG. 7 shows a pipeline 10 in which the pipe 22 is covered by an insulating composition, 20, that consists of tubular fillers in a bituminous material, where said tubular fillers are aligned parallel to the axis of the pipe 22

Figure 8:
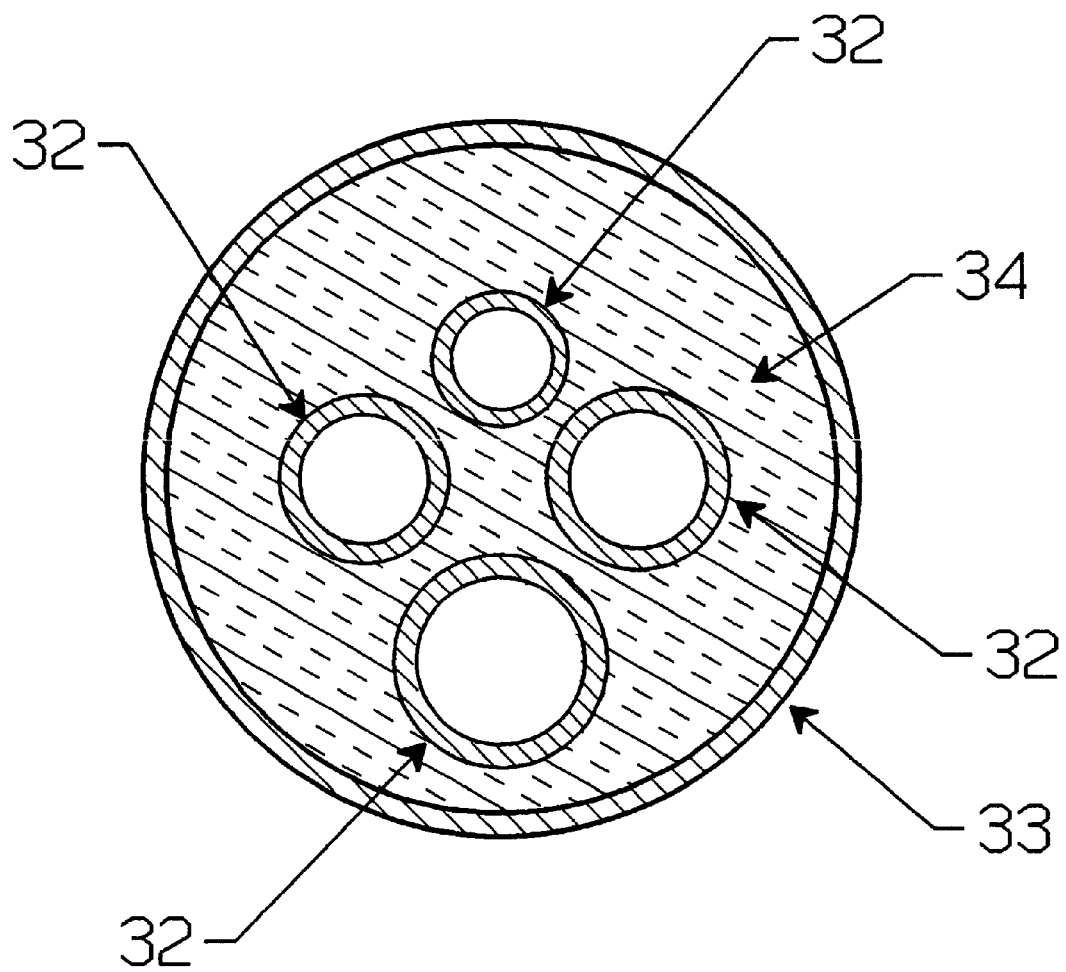
FIG. 8 shows a cross section of several flow lines bundled inside a floatation pipe, typical of arrangements used in the controlled depth tow method of installing multiple pipelines.

FIG. 8 is a cross section of several small flow lines, 32, bundled inside a floatation pipe, 33, and is typical of arrangements used in the controlled depth tow method of installing multiple lines at once. The insulating material, 34, also serves as ballast to sink the bundle once it is towed to the final destination. FIG. 9 is a cross section of a pipeline at the field joint, 27, wherein the most of the length of the pipes, 10 are factory coated with a corrosion coating 25, and layer of porous insulating material, 7, that supports and outer layer of a bituminous insulating composition, 5, and where the area near the field joint, 27, wrapped in sheet metal, 26, and then filled entirely with a bituminous insulation composition, 8, that is the same as or similar to the bituminous insulating composition, 5.

What is claimed is:

1. A pipeline comprising: pipe with a bituminous composition laminated onto a surface thereof and mechanical means for preventing said pipe from moving under its weight relative to said composition, said composition being applied to a thickness that will substantially inhibit heat transfer between the contents of the pipeline and the environment.

2. A pipeline comprising: pipe with a bituminous composition laminated onto a surface thereof and mechanical means for preventing said pipe from moving under its weight relative to said composition, said composition being applied to a thickness that will substantially inhibit heat transfer between the contents of the pipeline and the environment, wherein said means for keeping the pipe from moving through said insulating composition is a sleeve positioned along said pipeline, and adjacent to said insulating composition, said sleeve being held in a fixed position relative to, and spaced away from said pipeline by mechanical means that contact said pipe and said sleeve.

3. The pipeline of claim 2 wherein said sleeve is comprised of a cool stratum of said insulating composition that is mechanically stable enough that said mechanical means can react against it to contain a warmer stratum and inhibits or retards movement of the pipe through said warmer stratum for long periods of time.

4. The pipeline of claim 3 wherein said mechanical means for holding said sleeve in a fixed position relative to said pipe comprises wood.

5. A pipeline comprising: (a) a plurality of pipe sections welded together, (b) a layer of insulating concrete laminated onto a surface of each of said pipe sections along most of the length of said pipe, except for short sections at each weld, said layers being applied in advance of joining the sections of said pipe, (c) a layer of polymeric material laminated onto said concrete layer, and (d) a layer of said polymeric material laminated onto the pipe, welded after the pipes are joined, said polymeric layer being applied to a thickness that will match the diameter of the exposed surface of the polymeric layer on the rest of the pipe, and aid layer being fused to the polymeric layer on the rest of the pipe to form a continuous jacket.

6. A pipeline according to claim 5 wherein said polymeric layer is over an insulating layer that is laminated on the welded area.

\* \* \* \* \*